July 3, 1951 C. E. LEJA 2,559,079
ENGINE
Filed Oct. 15, 1947
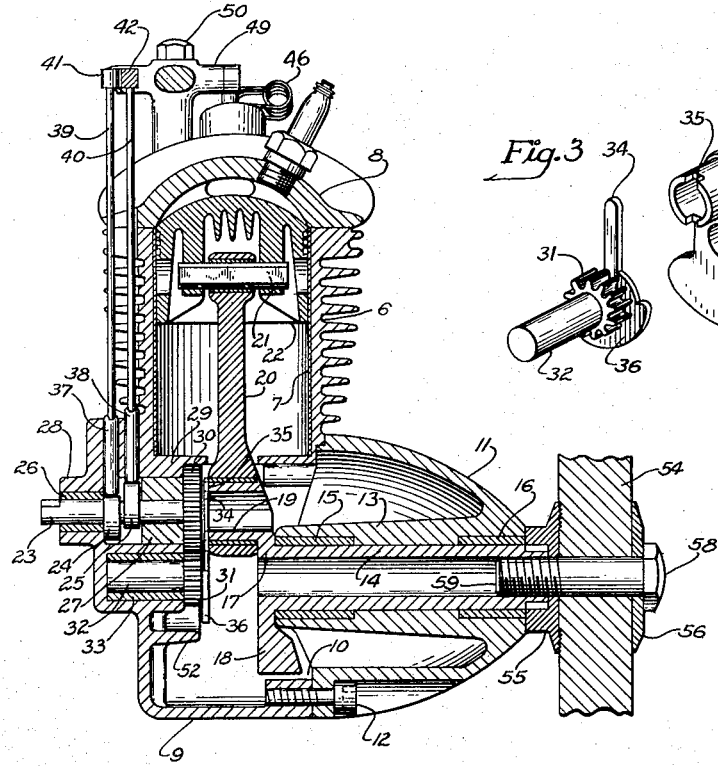
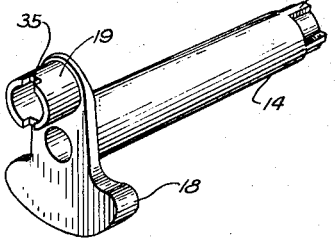
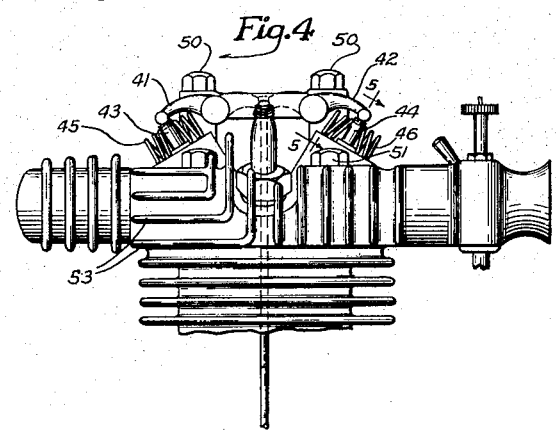
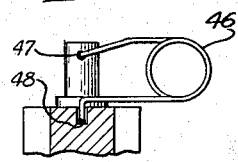
INVENTOR.
Casimir E. Leja
BY
Glenn S. Noble
Atty.

Patented July 3, 1951

2,559,079

UNITED STATES PATENT OFFICE 2,559,079

ENGINE

Casimir E. Leja, Chicago, Ill.

Application October 15, 1947, Serial No. 780,049

4 Claims. (Cl. 123—84)

This invention relates to internal combustion engines and is particularly directed to small engines of this type which are adapted for various uses and particularly for aviation and racing cars or models.

The principal object of the invention is to provide an improved engine of this type which will be simple in construction, easily started and durable and efficient in operation.

Other objects are to provide an improved engine housing; to provide a simplified crankshaft and improved camshaft drive; to provide an improved mounting for a propeller or fly wheel; to provide novel valve springs; and to provide such other improvements in construction and operation as will appear more fully from the following description.

In the accompanying drawing illustrating this invention,

Fig. 1 is a longitudinal sectional view with parts broken away or omitted for convenience in illustration;

Fig. 2 is a perspective view of the crankshaft;

Fig. 3 is a perspective view of the camshaft and driving mechanism;

Fig. 4 is a front view as taken from the right hand side of Fig. 1 particularly showing the improved cooling fins; and Fig. 5 is a detail of the valve spring mounting.

As shown in these drawings, 6 is the cylinder which is preferably provided with a steel lining 7 and cylinder head 8. The crankcase 9 is cast integrally with the cylinder and has an opening 10 which is concentric with the shaft and which is covered by a housing 11 secured thereto by means of cap screws 12 as shown. The housing 11 is of somewhat oval or egg-shape and is provided with an inwardly extending elongated bearing 13 for the tubular crankshaft 14. Bushings 15 and 16 are pressed into the ends of the bearing member 13 for engagement with the crankshaft. The crank arm 17 has a counter weight 18 at one end and a tubular crank pin 19 at the opposite end. The crank pin is engaged by one end of the connecting rod 20. The opposite end of the connecting rod engages with the wrist pin 21 of the piston 22.

The camshaft 23 is formed integrally with the cams 24 and 25 and is held in place by split bearings 26 and 27 which are first assembled on the camshaft and then pressed into bosses 28 and 29 provided in the crankcase for receiving the same.

The camshaft 23 has a gear 30 secured to its inner end which meshes with a pinion gear 31 formed integrally with a stub shaft 32 which is mounted in a bearing 33 in alignment with the axis of the shaft 13. The stub shaft 32 has a radially extending arm 34 which is also preferably formed integrally with the gear 31 and engages with a slot 35 in the end of the crank pin 19 as shown in Figs. 2 and 3. The arm 34 has a counter weight 36. By means of this gearing arrangement, the camshaft will be driven at the proper speed and it will be particularly noted that the pinion 31 will remain in the crankcase and the proper timing will be maintained when the crank pin engages with the arm 34. This arrangement provides for the convenient removal of the crank and again assembling the same without disturbing the valve timing.

The cams 24 and 25 engage respectively with cam followers 37 and 38 which actuate the push rods 39 and 40 for operating the rocker arms 41 and 42 which coact with the valve stems 43 and 44 in the usual manner.

The valve stems are raised by springs 45 and 46, the particular construction and arrangement of which constitutes one of the important features of the present invention. These springs are of the hairpin type with their central portions extending through holes 47 in the ends of the valve stems. The coil portions of the springs are positioned on either side of the valve stem and their terminal portions 48 engage with holes in the upper surface of the cylinder head as shown in Fig. 5. The downwardly projecting portions 48 are of sufficient length so that the ends thereof bear against the bottoms of the holes and provide the only points of contact between the springs and the cylinder head. The arrangement is such that the bearing portions of the springs will be in alignment with the center line of the valve stems and thus tend to prevent any lateral pressure on the upper portions of such stems when the valves are operated.

This type of floating spring has a higher period of vibration or oscillation than an ordinary coiled spring and does not tend to surge as readily as such springs. The rocker arms are pivotally mounted in a housing or bracket 49 which is secured by means of two studs 50 which studs also serve to fasten the cylinder head to the cylinder. The cylinder head is further fastened by two similar shorter studs 51. This arrangement adds to the saving in weight and simplicity of construction.

A substantially circular guard or protector 52 which is concentric with the axis of the crankshaft is cast at the rear of the crankcase and extends inwardly over the camshaft gears. This guard prevents damage to the connecting rod when the propeller or fly wheel is removed and the engine is cranked, or also in the event of certain kinds of accidents or "crack-ups."

Some of the cylinder head cooling fins such as shown at 53 are arranged to curve from a horizontal plane to a vertical plane, thereby giving more fin area on the exhaust side of the cylinder head as shown in Fig. 4. This particular arrangement adds greatly in maintaining the proper temperature of the engine for giving the highest efficiency.

The driven member 54 which may be a propeller, fly wheel, pulley, or the like, is mounted between two discs 55 and 56. The disc 55 is secured to the shaft 14 preferably by means of splines or projections 57 which fit in corresponding grooves in the hub of the disc. A cap screw or bolt 58 extends through the discs and driven member and is threaded to engage with the corresponding threads 59 in the end of the crankshaft 14. This permits an easy and convenient mounting of the propeller, or the like, and in the event of damage, there is little possibility of injury to the crankshaft.

From this description, it will be seen that I provide an engine in which the crankshaft housing is such that it provides for ease of assembly in production, and furthermore increases the capacity of the crankcase. This lowers the crankcase compression and results in cleaner and more efficient running. The construction whereby the crankcase and cylinder are cast together with necessary bosses or projections or various operating parts further enhances the simplicity of construction and economy in the manufacture of the engine as well as improvement in the operation of the same.

It will be noted that the engine may be provided with any desired form of ignition and other coacting devices such as fuel supply, and the like, in order to make an operative structure, but such parts have not been described as they form no part of the invention except as instrumentalities used in the operation of the same.

It will also be noted that changes may be made in the details of construction or arrangement of the parts without departing from the spirit and scope of the invention, and therefore I do not wish to be limited to the particular construction shown and described except as set forth in the following claims in which I claim:

1. In an internal combustion engine, the combination of a cylinder, a crankcase, a crankcase housing extending outwardly from the crankcase and forming an extension therefor and having a bearing extending into the crankcase, a crankshaft mounted in said bearing, a piston in said cylinder, a piston rod connecting the piston with the crank, said crankshaft having its crank pin extending a short distance only through the piston rod and having a transverse slot therein, a stub shaft mounted in the crankcase in alignment with the crankshaft, a pinion on the stub shaft adjacent to the crank pin, an arm extending radially from the stub shaft and engaging with the slot in the crank pin, a camshaft mounted adjacent to the stub shaft and a gear on the camshaft engaging with the pinion on the stub shaft, the arrangement being such that the stub shaft and pinion may remain in the crankcase when the crankshaft is removed and the timing will be maintained when the crankshaft is inserted with the slot in the crank pin engaging with said arm.

2. Valve actuating means for an internal combustion four-cycle engine having a crankcase which is closed at one end, a bearing extending inwardly from the closed end and open to the crankcase, a stub shaft mounted in the bearing and extending into the case, a gearing on the inner end of the stub shaft formed integrally therewith, an arm formed integrally with the gear and extending at right angles thereto, the crankcase having an opening opposite the closed end, a housing covering said opening, a crankshaft bearing in the housing, a crankshaft mounted in said bearing and having a crank pin with a transverse slot in the end thereof which is engaged by said arm, a removable bearing in the closed end adjacent to the stub shaft bearing, a camshaft mounted in said bearing and extending into the crankcase, a gear on said camshaft which meshes with the first named gear, and cams formed integrally with the camshaft which are also positioned in the crankcase.

3. An engine having a crankcase which is closed at one end, a bearing in the closed end which opens into the crankcase, a stub shaft mounted in said bearing and extending into the case, a gearing carried by the stub shaft, an arm on the gearing extending radially therefrom, the crankcase having an opening opposite the closed end which is sufficiently large to permit the insertion of the stub shaft with the parts mounted thereon into position through said opening, a housing for said opening, a crankshaft bearing in the housing, a crankshaft mounted in the bearing and having a crank pin with a transverse slot in the end thereof which is engaged by said arm for turning the stub shaft, the arrangement being such that the stub shaft and parts connected therewith may be readily inserted through the opening and the housing with the crankshaft therein may be assembled to bring the arm in engagement with the crank pin.

4. An engine having a crankcase closed at one end, a bearing in the closed end, a stub shaft mounted in the bearing and extending into the case, a gear carried by said stub shaft, an arm extending radially from said gear, a bearing in the closed end adjacent to the bearing for the stub shaft, a cam shaft mounted in said bearing and extending into the crankcase, a gear on said cam shaft which meshes with the first named gear, and a substantially circular guard projecting from the crankcase wall and extending inwardly over said gears, substantially as described.

CASIMIR E. LEJA.

REFERENCES CITED

The following references are of record in the file of this patent:

UNITED STATES PATENTS

| Number | Name | Date |
|---|---|---|
| 615,766 | Vansickle | Dec. 13, 1898 |
| 815,779 | Bailleul | Mar. 20, 1906 |
| 872,571 | Moser | Dec. 3, 1907 |
| 1,422,729 | Waterhouse | July 11, 1922 |
| 1,447,245 | Gore | Mar. 6, 1923 |
| 1,974,802 | Chilton | Sept. 25, 1934 |
| 2,085,976 | Heintz | July 6, 1937 |
| 2,252,600 | May | Aug. 12, 1941 |
| 2,419,274 | McDowall et al. | Apr. 22, 1947 |